United States Patent
Seo et al.

(10) Patent No.: US 10,652,883 B2
(45) Date of Patent: May 12, 2020

(54) METHOD FOR ALLOCATING RESOURCES FOR CONTROL SIGNAL OF DEVICE-TO-DEVICE DIRECT COMMUNICATION IN WIRELESS COMMUNICATION SYSTEM, AND DEVICE THEREFOR

(71) Applicant: LG ELECTRONICS INC., Seoul (KR)

(72) Inventors: Hanbyul Seo, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 167 days.

(21) Appl. No.: 15/325,370

(22) PCT Filed: Jul. 17, 2015

(86) PCT No.: PCT/KR2015/007443
§ 371 (c)(1),
(2) Date: Jan. 10, 2017

(87) PCT Pub. No.: WO2016/021846
PCT Pub. Date: Feb. 11, 2016

(65) Prior Publication Data
US 2017/0201988 A1      Jul. 13, 2017

Related U.S. Application Data

(60) Provisional application No. 62/032,621, filed on Aug. 3, 2014.

(51) Int. Cl.
*H04W 72/04*    (2009.01)
*H04W 72/14*    (2009.01)
*H04W 92/18*    (2009.01)

(52) U.S. Cl.
CPC ....... *H04W 72/0446* (2013.01); *H04W 72/04* (2013.01); *H04W 72/0406* (2013.01); *H04W 72/14* (2013.01); *H04W 92/18* (2013.01)

(58) Field of Classification Search
CPC ......... H04W 72/0446; H04W 72/0406; H04W 72/14; H04W 72/04; H04W 92/18
See application file for complete search history.

(56) References Cited

U.S. PATENT DOCUMENTS

2013/0215814 A1    8/2013  Lee et al.
2013/0322413 A1*  12/2013  Pelletier ............ H04W 72/1289
                                                       370/336
(Continued)

FOREIGN PATENT DOCUMENTS

CN    103139764    6/2013
WO    2013157870   10/2013

OTHER PUBLICATIONS

Ericsson, "Overview of D2D functions and standardization impact", 3GPP TSG RAN WG1 Meeting #76, Prague, Czech Republic, Feb. 10-14, 2014, R1-140771. (Year: 2014).*

(Continued)

*Primary Examiner* — Shailendra Kumar
(74) *Attorney, Agent, or Firm* — Lee, Hong, Degerman, Kang & Waimey

(57) ABSTRACT

A method for allocating resources for a control channel of device-to-device direct communication in a wireless communication system is disclosed in the present application. Particularly, the method comprises the steps of: receiving, in a subframe no. 1 from a base station, grant signal no. 1 for allocating time resource no. 1 for the control channel, which consists of two or more subframes, of device-to-device direct communication; and transmitting, to another terminal, the control channel of device-to-device direct communication on the basis of the grant signal no. 1, wherein the (Continued)

subframe no. 1 precedes by a preset number of subframes earlier than the first subframe of the time resource no. 1.

6 Claims, 10 Drawing Sheets

(56) References Cited

U.S. PATENT DOCUMENTS

| | | | |
|---|---|---|---|
| 2014/0038590 A1* | 2/2014 | Wijting | H04W 76/14 455/426.1 |
| 2014/0321423 A1* | 10/2014 | Kalhan | H04W 72/0493 370/330 |
| 2014/0369292 A1* | 12/2014 | Wu | H04W 72/04 370/329 |
| 2015/0271807 A1* | 9/2015 | Patil | H04W 76/14 455/426.1 |

OTHER PUBLICATIONS

Ericsson, "On Procedures for In/Out of NW coverage detection for D2D", 3GPP TSG RAN WG1 Meeting #76, Prague, Czech Republic, Feb. 10-14, 2014, R1-140780. (Year: 2014).*

Huawei et al., "Scheduling Assignment Design for D2D", 3GPP TSG RAN WG1 Meeting #77, May 10, 2014, R1-141920, (Year: 2014).*

Huawei et al., "Scheduling Assignment Content for D2D", 3GPP TSG RAN WG1 Meeting #77, May 10, 2014, R1-141927. (Year: 2014).*

ZTE, "Scheduling-based D2D Communication Resource Allocation", 3GPP TSG-RAN WG1 #76bis, Shenzhen, China, Mar. 31-Apr. 4, 2014, R1-141427 (Year: 2014).*

European Patent Office Application Serial No. 15830459.2, Search Report dated Feb. 9, 2018, 9 pages.

PCT International Application No. PCT/KR2015/007443, Written Opinion of the International Searching Authority dated Oct. 29, 2015, 20 pages.

LG Electronics, "Operational procedure in Mode 1 for D2D communication", R1-142150, 3GPP TSG RAN WG1 Meeting #77, May 2014, 3 pages.

Huawei, "Scheduling assignment design for D2D", R1-141920, 3GPP TSG RAN WG1 Meeting #77, May 2014, 3 pages.

Huawei, "Scheduling assignment content for D2D", R1-141927, 3GPP TSG RAN WG1 Meeting #77, May 2014, 4 pages.

ZTE, "Scheduling-based D2D Communication Resource Allocation", R1-141427, 3GPP TSG RAN WG1 Meeting #76bis, Apr. 2014, 4 pages.

State Intellectual Property Office of the People's Republic of China Application Serial No. 201580041329.5, Office Action dated Jun. 24, 2019, 16 pages.

* cited by examiner

FIG. 2
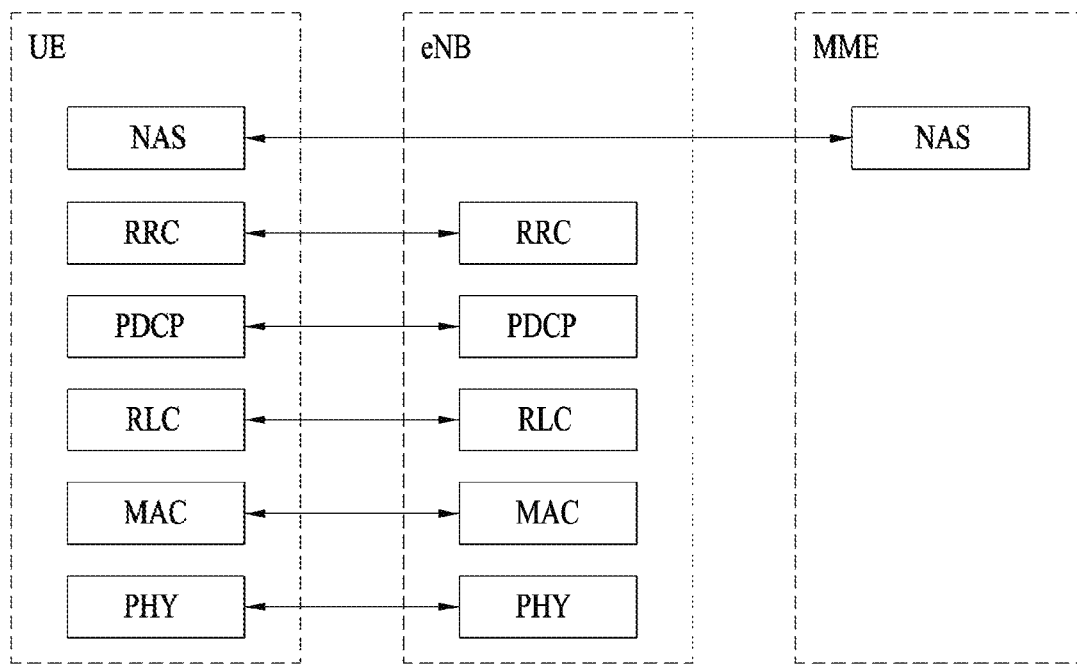
(A) CONTROL-PLANE PROTOCOL STACK
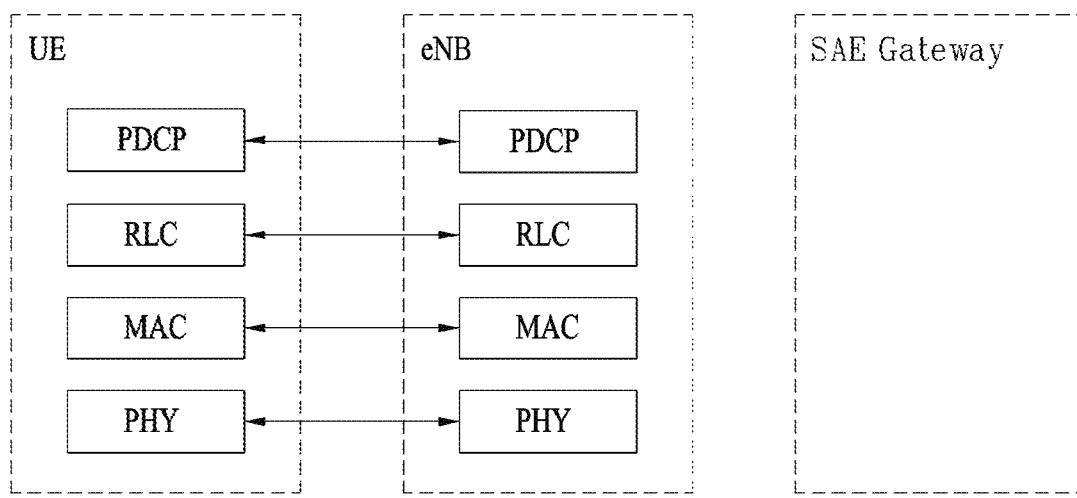
(B) USER-PLANE PROTOCOL STACK

METHOD FOR ALLOCATING RESOURCES FOR CONTROL SIGNAL OF DEVICE-TO-DEVICE DIRECT COMMUNICATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2015/007443, filed on Jul. 17, 2015, which claims the benefit of U.S. Provisional Application No. 62/032,621, filed on Aug. 3, 2014, the contents of which are all hereby incorporated by reference herein in their entirety.

TECHNICAL FIELD

The present invention relates to a wireless communication system, and more particularly, to a method of allocating a resource for a control signal of device-to-device direct communication in a wireless communication and an apparatus therefor.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF THE INVENTION

Technical Task

Based on the aforementioned discussion, the present invention intends to propose a method of allocating a resource for a control signal of device-to-device direct communication in a wireless communication and an apparatus therefor in the following description.

Technical Solution

To achieve these and other advantages and in accordance with the purpose of the present invention, as embodied and broadly described, according to one embodiment, a method of allocating a resource for a control channel of device-to-device (D2D) direct communication in a wireless communication system, the method includes the receiving a first grant signal to allocate a first time resource for the D2D direct communication consisting of two or more subframes from a base station in a first subframe, and transmitting the control signal of the D2D direct communication to a different terminal based on the first grant signal. In this case, the first subframe precedes a first subframe of the first time resource as many as predetermined subframes.

Preferably, the method can further include receiving a second grant signal to allocate a second time resource for the D2D direct communication consisting of two or more subframes from the base station in a second subframe, and transmitting the control signal of the D2D direct communication to the different terminal based on the second grant signal. In this case, the second subframe precedes a first subframe of the second time resource as many as the predetermined subframes.

More preferably, the transmitting the control channel of the D2D direct communication includes repeatedly transmitting the control channel to the different terminal in the first time resource.

To further achieve these and other advantages and in accordance with the purpose of the present invention, according to a different embodiment, a terminal performing device-to-device (D2D) direct communication in a wireless communication system includes a wireless communication module configured to transceive a signal with a base station or a different terminal, and a processor configured to process the signal, the processor configured to receive a first grant signal to allocate a first time resource for the D2D direct communication consisting of two or more subframes from the base station in a first subframe, the processor configured to control the wireless communication module to transmit the control signal of the D2D direct communication to the different terminal based on the first grant signal. In this case, the first subframe precedes a first subframe of the first time resource as many as predetermined subframes.

Preferably, the processor is configured to receive a second grant signal to allocate a second time resource for the D2D direct communication consisting of two or more subframes from the base station in a second subframe and configured to control the wireless communication module to transmit the control signal of the D2D direct communication to the different terminal based on the second grant signal. In this case, the second subframe precedes a first subframe of the second time resource as many as the predetermined subframes.

More preferably, the processor is configured to control the wireless communication module to repeatedly transmit the control channel to the different terminal in the first time resource.

In the aforementioned embodiments, the first subframe and the second subframe correspond to downlink subframes and the first time resource and the second time resource include two or more uplink subframes. And, it is preferable that the predetermined subframes correspond to 4 subframes. The first time resource and the second time resource include two or more consecutive subframes.

Advantageous Effects

According to embodiments of the present invention, it is able to efficiently allocate a resource for a control signal of device-to-device direct communication and it is able to efficiently transmit and receive a signal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram illustrating structures of a control plane and a user plane of a radio interface protocol between a user equipment and E-UTRAN based on the 3GPP radio access network standard;

BEST MODE

Mode for Invention

Figure 1:
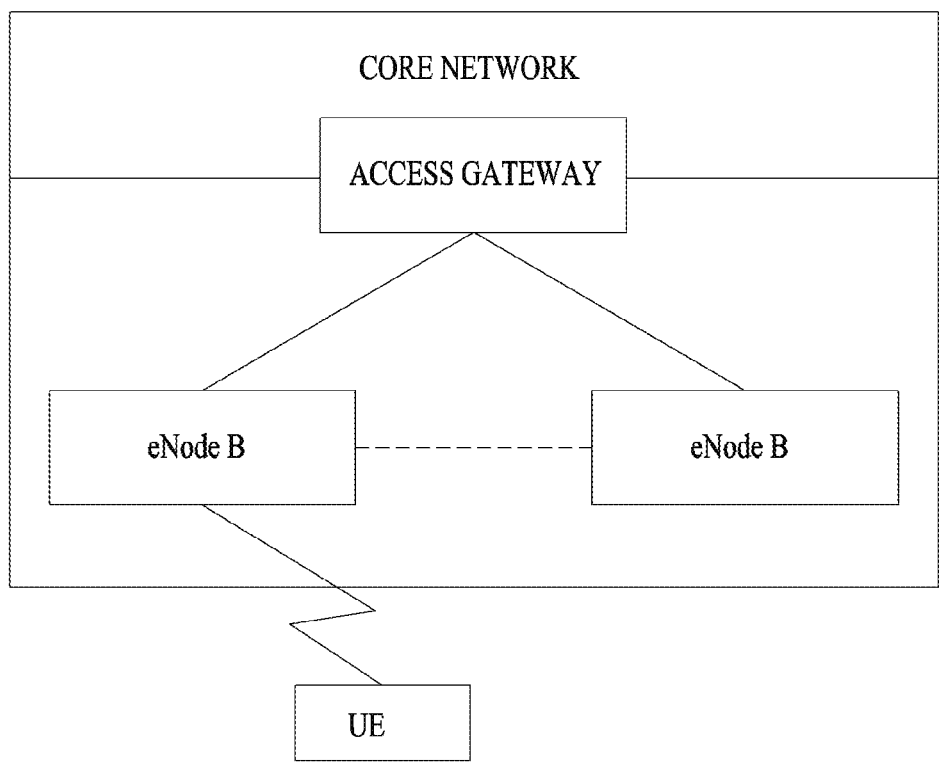
FIG. 1 is a schematic diagram of E-UMTS network structure as one example of a wireless communication system.

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

In the present specification, a name of a base station can be used as a comprehensive terminology including an RRH (remote radio head), an eNB, a TP (transmission point), an RP (reception point), a relay, and the like.

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane.

The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. If there is RRC connection between a user equipment and an RRC layer of a network, the user equipment is in an RRC connected mode. Otherwise, the user equipment is in an RRC idle mode. A NAS (non-access stratum) layer, which is located at the top of the RRC layer, performs such a function as session management and mobility management.

One cell constituting a base station (eNB) is set to one of bandwidths of 1.4, 3.5, 5, 10, 15, and 20 MHz and provides a downlink or uplink transmission service to several user equipments. At this time, different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 3:
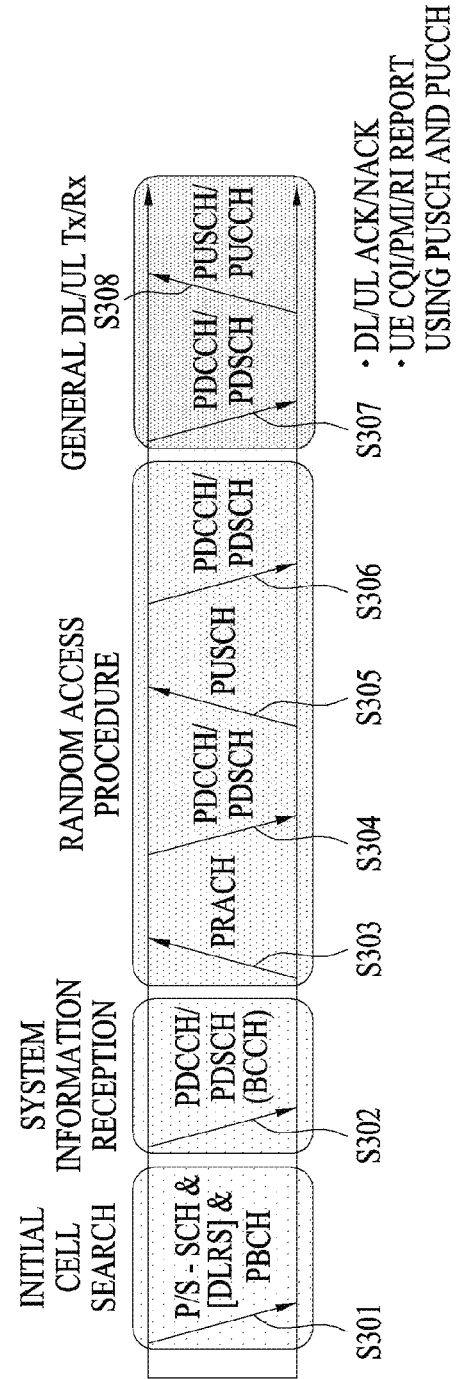
FIG. 3 is a diagram illustrating physical channels used in a 3GPP LTE system and a general method for transmitting a signal using the physical channels.

FIG. 3 is a diagram showing physical channels used in a 3GPP system and a general signal transmission method using the same.

When a UE is powered on or enters a new cell, the UE performs an initial cell search operation such as synchronization with an eNB (S301). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S302).

When the UE initially accesses the eNB or has no radio resources for signal transmission, the UE may perform a random access procedure (RACH) with respect to the eNB (steps S303 to S306). To this end, the UE may transmit a specific sequence as a preamble through a physical random access channel (PRACH) (S303 and S305) and receive a response message to the preamble through the PDCCH and the PDSCH corresponding thereto (S304 and S306). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S308), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
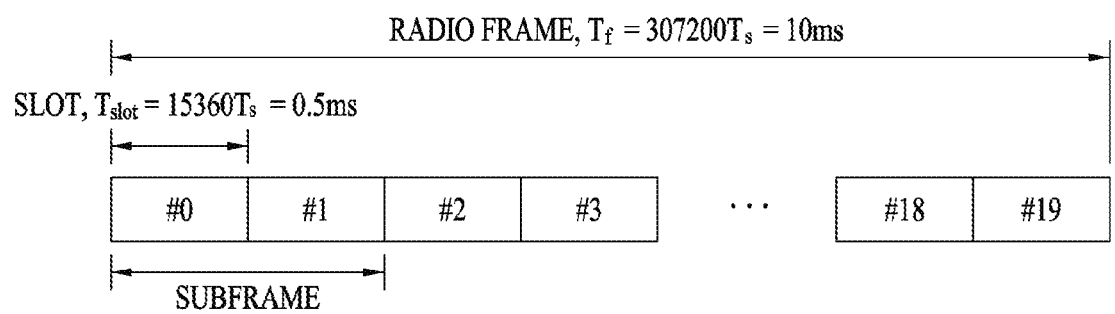
FIG. 4 is a diagram illustrating a structure of a radio frame used in an LTE system.

FIG. 4 is a diagram for a structure of a radio frame used in an LTE system.

Referring to FIG. 4, one radio frame has a length of 10 ms ($327{,}200 \times T_s$) and is constructed with 10 subframes in equal size. Each of the subframes has a length of 1 ms and is constructed with two slots. Each of the slots has a length of 0.5 ms ($15{,}360 \times T_s$). In this case, $T_s$ indicates a sampling time and is represented as $T_s = 1/(15\,\text{kHz} \; 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
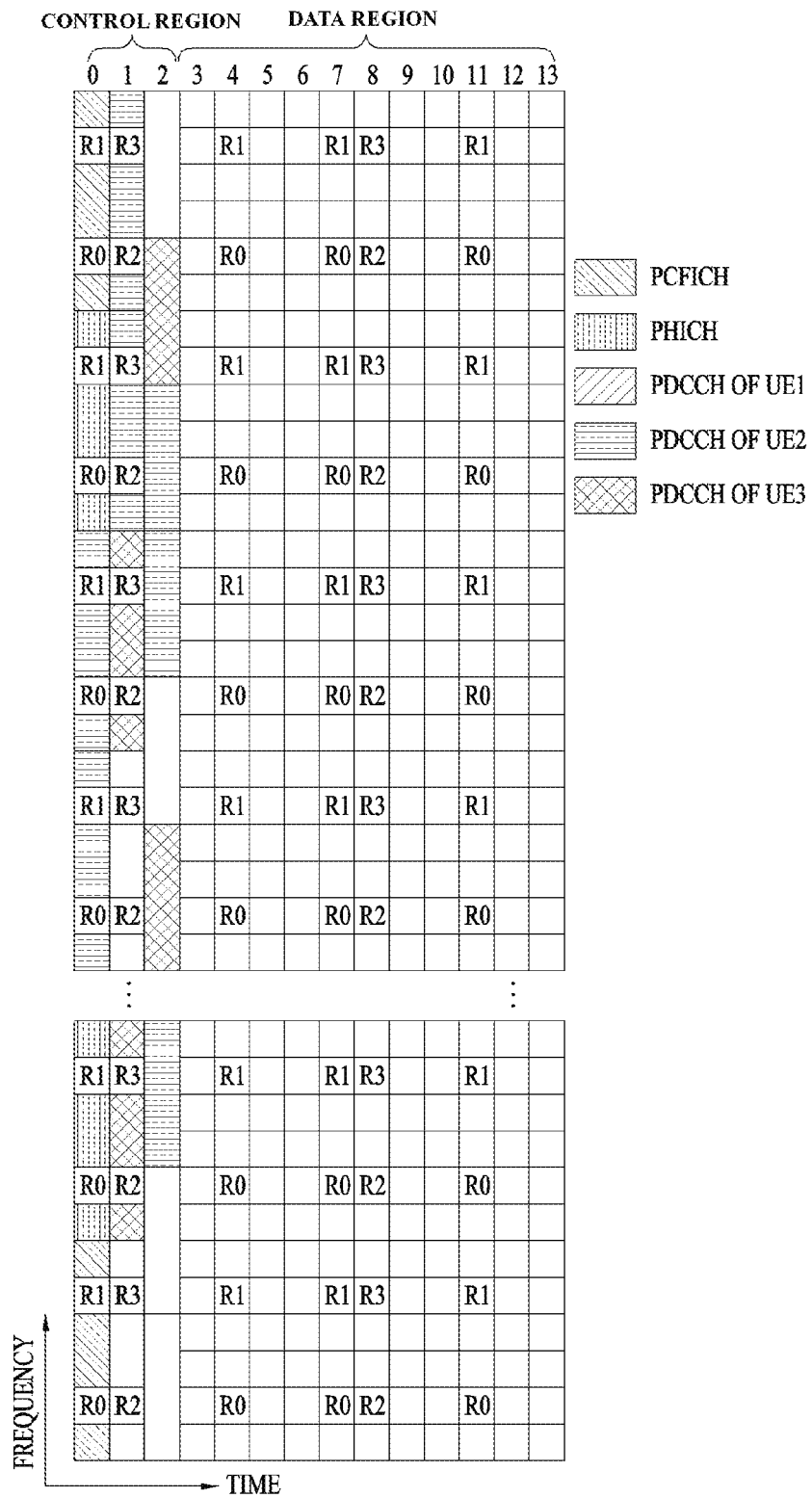
FIG. 5 is a diagram illustrating a structure of a downlink radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
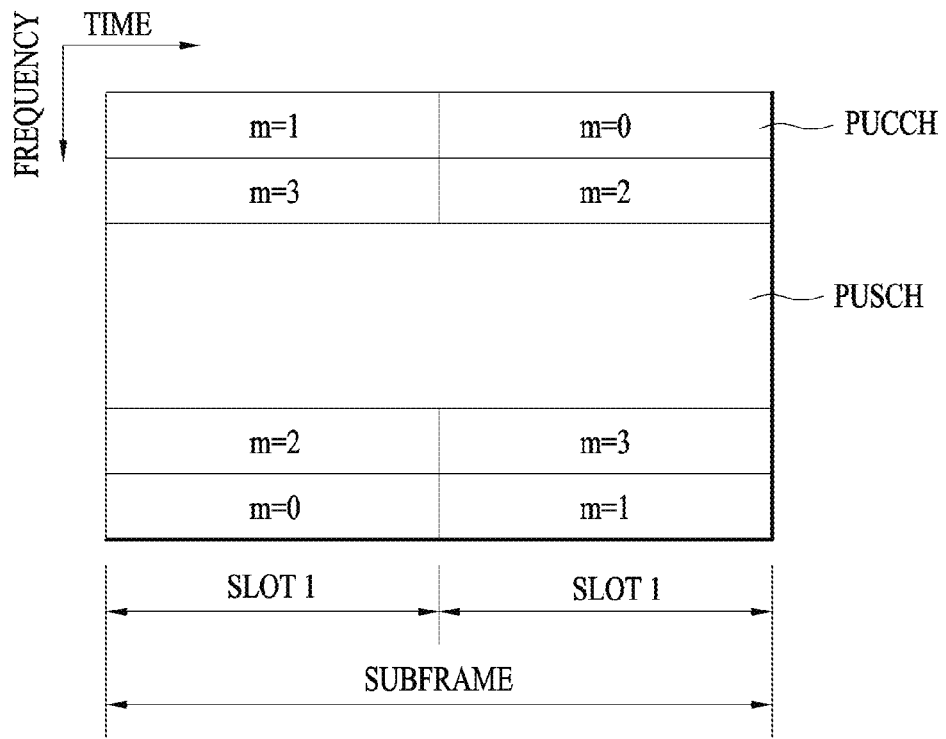
FIG. 6 is a diagram illustrating a structure of an uplink subframe used in an LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Figure 7:
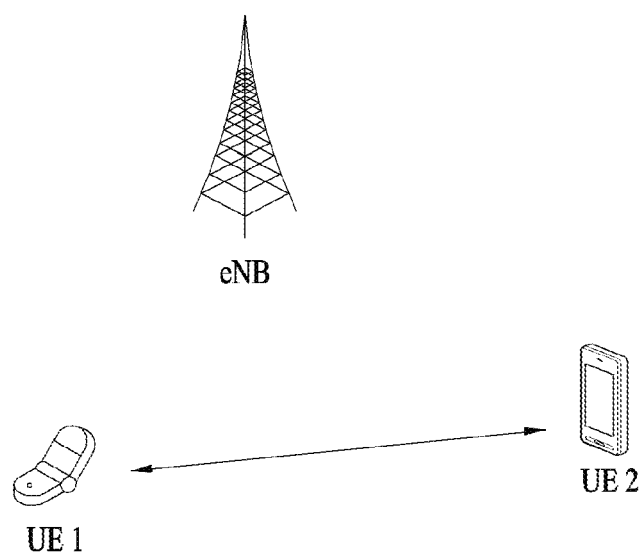
FIG. 7 is a conceptual diagram for device-to-device direct communication.

FIG. 7 is a conceptual diagram for device-to-device direct communication.

Referring to FIG. 7, in D2D (device-to-device) communication in which a UE directly performs wireless communication with a different UE (i.e., D2D direct communication), an eNB can transmit a scheduling message to indicate D2D transmission and reception. A UE participating in the D2D communication receives a D2D scheduling message from an eNB and performs transmission and reception operations indicated by the D2D scheduling message. In this case, the UE corresponds to a terminal of a user. However, if such a network entity as an eNB transceiver a signal with a UE according to a communication scheme determined between the eNB and the UE, the eNB can also be considered as a sort of UEs. In the following, a link directly established between UEs is referred to as a D2D link and a link established between a UE and an eNB for communication is referred to as an NU link.

A case that a UE1 selects a resource unit corresponding to a specific resource from a resource pool corresponding to a set of resources and the UE1 transmits a D2D signal using the selected resource unit is explained in the following. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission.

Figure 8:
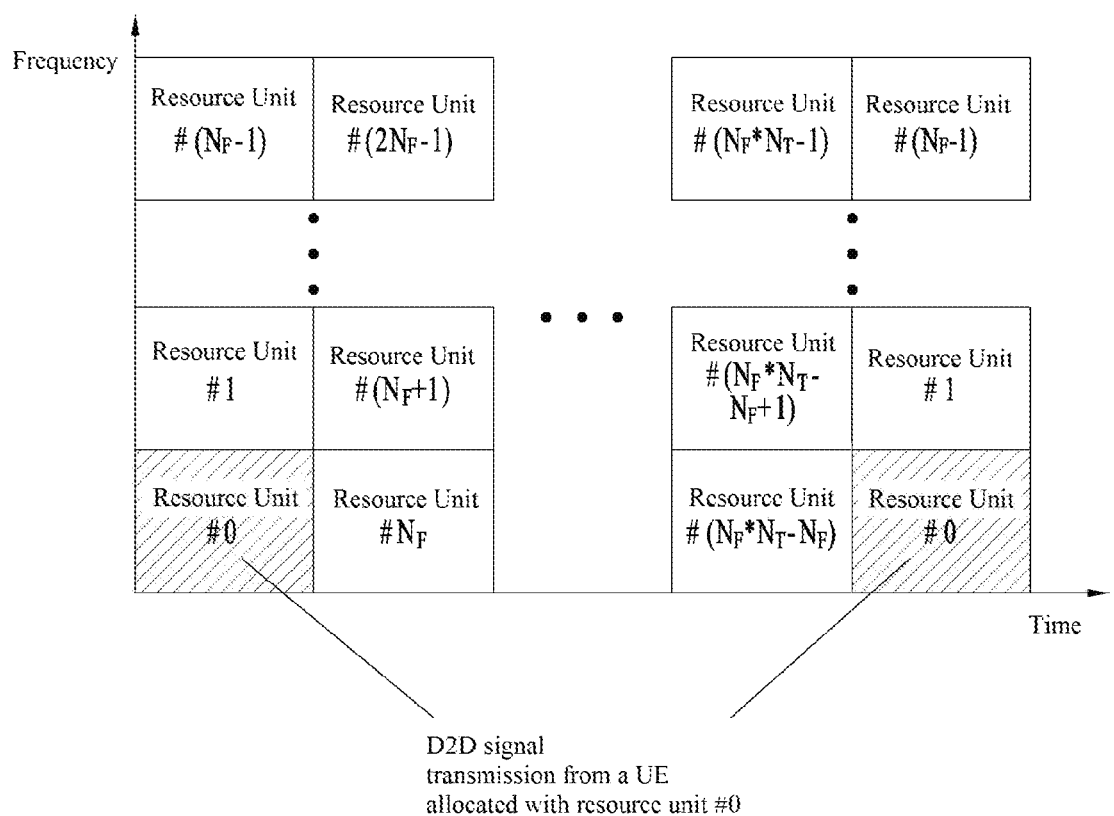
FIG. 8 is a diagram for an example of configuring a resource pool and a resource unit.

FIG. 8 is a diagram for an example of configuring a resource pool and a resource unit.

Referring to FIG. 8, the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

The resource pool can be classified into various types. First of all, the resource pool can be classified according to content of a D2D signal transmitted via each resource pool. For example, the content of the D2D signal can be classified into an SA signal, a D2D data channel signal, and a discovery signal described in the following.

1) SA (scheduling assignment): The SA signal may correspond to a signal including information on a resource position of a D2D data channel, information on MCS (modulation and coding scheme) necessary for modulating and demodulating a data channel, information on a MIMO transmission scheme, and the like. The SA signal can be transmitted on an identical resource unit in a manner of being multiplexed with D2D data. In this case, an SA resource pool may correspond to a pool of resources that an SA and D2D data are transmitted in a manner of being multiplexed.

2) D2D data channel: The D2D data channel corresponds to a channel used by a transmission UE to transmit user data. If an SA signal and a D2D data channel are transmitted in a manner of being multiplexed in an identical resource unit, an RE (resource element), which is used to transmit SA information in a specific resource unit of an SA resource pool, can also be used for transmitting D2D data in a D2D data channel resource pool.

3) Discovery signal: The discovery signal may correspond to a resource pool for a signal that enables a neighboring UE to discover a transmission UE transmitting information such as ID of the UE, and the like.

Meanwhile, although contents of D2D signal are identical to each other, it may use a different resource pool according to a transmission/reception attribute of the D2D signal. For example, in case of the same D2D data channel or the same discovery signal, the D2D data channel or the discovery signal can be classified into a different resource pool according to a transmission timing determination scheme of a D2D signal, a resource allocation scheme, and a signal format.

Meanwhile, an operation of designating a transmission resource of a D2D signal to an individual transmission UE designated by an eNB is referred to as a mode 1. According to the mode 1, it is necessary for the eNB to respectively designate time/frequency resource for SA and D2D data. In this case, in order to dynamically allocate a resource, it may use such a physical layer control signal as PDCCH and EPDCCH. A resource allocation message for SA and D2D data transmitted through the physical layer control signal is referred to as a D2D grant.

In order to reduce control signal overhead, it is preferable to allocate resources for at least one SA transmission and D2D data transmission (one or more transmissions depending on a configuration) at the same time by a single D2D grant. In this case, a frequency resource to be used by the SA and the D2D data may use a frequency resource allocation field included in the D2D grant. This principle is basically identical to the use of a frequency resource allocation field in an uplink grant for PUSCH transmission resource allocation.

A time resource for D2D data may use a time resource allocation field included in the D2D grant. The time resource of the D2D data should deliver not only information on a subframe to be used for the D2D data but also additional information on timing at which a new data packet is transmitted. Hence, although there exists control channel overhead, it is preferable to use an explicit bit field.

On the contrary, it may be preferable to implicitly designate a time resource for SA via a position of the D2D grant without using a separate bit field. This is because it is able to reduce overhead of a control channel by reusing the principle of allocating LTE PUSCH resource for implicitly designating transmission timing of PUSCH from a position of an uplink grant based on a predetermined timeline. And, in the aspect of a transmission UE, since SA transmission corresponds to a first operation performed by the transmission UE after the D2D grant is received, the implicit designation can be more effective.

The present invention explains a method of designating a time resource of SA using a position of a D2D grant. First of all, when an uplink grant is received in a subframe #n, assume an uplink timeline of FDD that a PUSCH time resource for the received uplink grant becomes a subframe #n+4.

In order to secure sufficient coverage, SA can be transmitted over a plurality of subframes. If a single SA is transmitted over a plurality of subframes, subframes used for the single SA can be commonly referred to as an SA time resource unit. Subframes belonging to a single SA time resource unit can be determined by consecutive subframes among subframes belonging to an SA resource pool.

First of all, for clarity, assume that a first subframe belonging to a specific SA time resource unit #x corresponds to a subframe #n. If it is necessary to have time as much as processing time between an uplink grant and PUSCH transmission, a D2D grant transmitted in a subframe #n−4 can schedule SA transmission in the SA time resource unit #x. However, a D2D grant transmitted in a subframe after the subframe #n−4 is unable to schedule SA transmission. In particular, in the SA time resource unit #x where a first subframe corresponds to the subframe #n, a D2D grant for scheduling SA transmission should be transmitted in the subframe #n−4 or earlier.

If one D2D grant transmission subframe is connected with each SA time resource unit, it may be able to connect a subframe ahead of a first subframe of an SA time resource unit by as many as 4 subframes.

Figure 9:
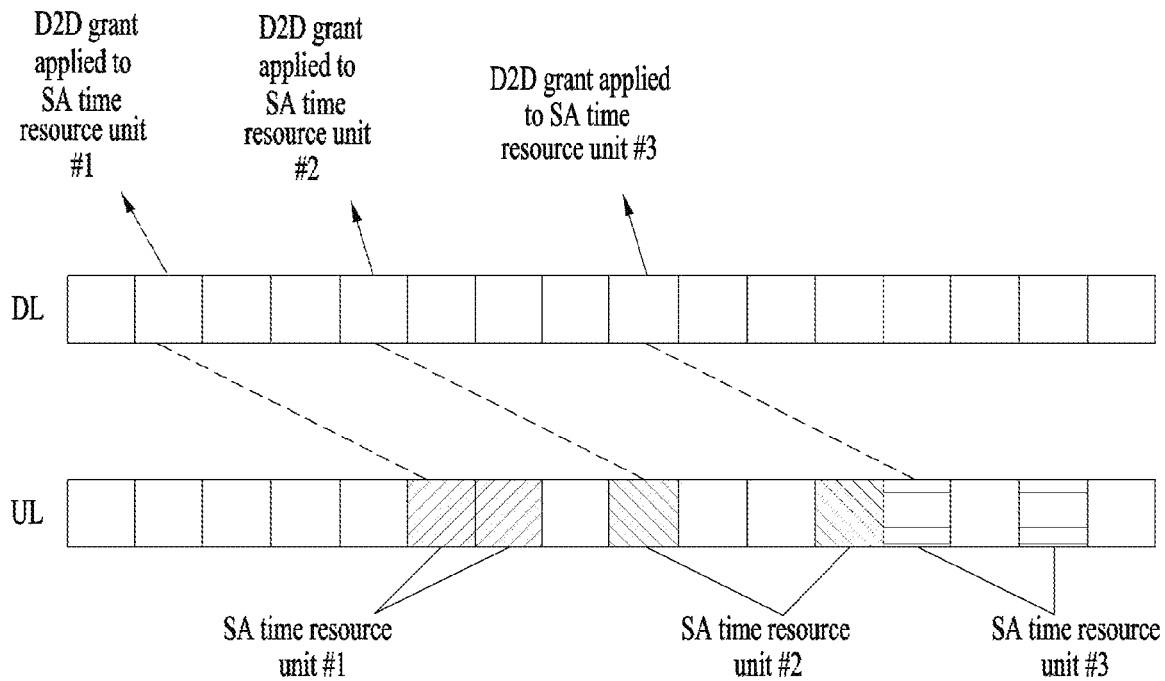
FIG. 9 is a diagram for an example of allocating SA time resource unit using a D2D grant in a FDD system according to embodiment of the present invention.

FIG. 9 is a diagram for an example of allocating SA time resource unit using a D2D grant in a FDD system according to embodiment of the present invention.

Referring to FIG. 9, when 6 subframes are included in an SA resource pool, it may bind two contiguous subframes among the subframes included in the SA resource pool to form 3 SA time resource units in total. In this case, if a first subframe of each SA time resource unit corresponds to a subframe #n, it may be able to interpret it as a D2D grant transmitted in a subframe #n−4 that schedules SA transmission in the SA time resource unit.

Or, as an extended example of FIG. 9, all subframes, which are positioned after a subframe capable of scheduling a previous SA time resource unit, can be configured to schedule a next SA time resource unit.

Figure 10:
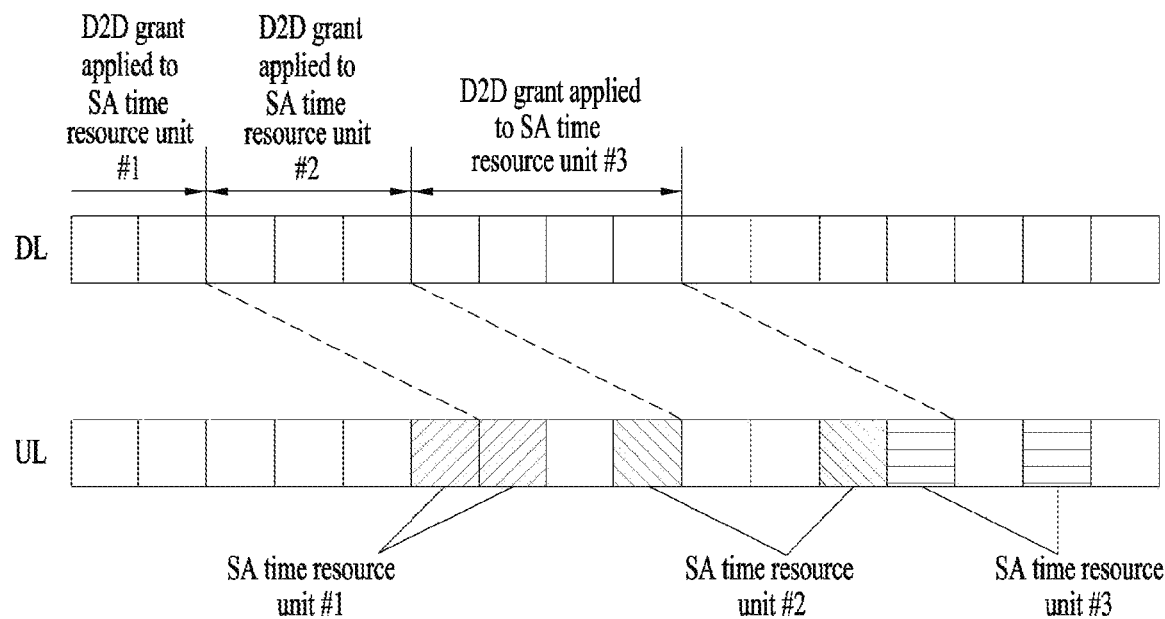
FIG. 10 is a diagram for a different example of allocating SA time resource unit using a D2D grant in a FDD system according to embodiment of the present invention.

FIG. 10 is a diagram for a different example of allocating SA time resource unit using a D2D grant in a FDD system according to embodiment of the present invention. In particular, FIG. 10 requires an assumption that there is no SA initiating transmission in a second subframe according to an SA time resource unit.

When FIG. 10 is compared with FIG. 9, it is able to check that a D2D grant for scheduling an SA time resource unit #2 can be transmitted after a subframe in which an SA time resource unit #1 is lastly scheduled. It may be able to better secure positions of D2D grants capable of scheduling an identical SA time resource unit through the aforementioned method. By doing so, it may be able to reduce a problem of increasing the number of D2D grants. Of course, it may be able to designate a subframe in which a D2D grant is not transmitted in advance via a separate higher layer signal. In this case, a subframe in which a D2D grant is transmitted shown in FIG. 10 can be excluded from D2D grant transmission.

In the foregoing description, it is assumed that an interval as much as 3 ms exists between D2D grant timing and SA transmission timing and a D2D grant of a subframe #n schedules SA transmission in a subframe #n+4 or later, by which the present invention may be non-limited. The aforementioned assumption can be generalized as follows. It may be able to assume that the D2D grant of the subframe #n schedules SA transmission in a subframe #n+k (where, k is an integer equal to or greater than 4) or later. In this case, it may be able to adjust the implicit relation between the D2D grant and the SA time resource unit mentioned earlier in FIGS. 9 and 10.

The aforementioned method can be applied not only to FDD system but also to TDD system. Yet, since the TDD system has a different uplink HARQ timeline according to a UL/DL configuration, the aforementioned principle can be modified according to a currently used uplink HARQ timeline.

As an example, assume that the principle mentioned earlier in FIG. 9 is applied. When an uplink grant of a subframe #n−k schedules PUSCH of a subframe #n on a currently used uplink HARQ timeline of a TDD system, if a first subframe of a specific SA time resource unit #x corresponds to the subframe #n, the D2D grant of the subframe #n−k also schedules SA transmission in the SA time resource unit #x.

Table 1 in the following shows an uplink grant of a subframe in which PUSCH of a specific UL subframe is scheduled in TDD. Referring to Table 1, in case of UL/DL configuration #1, PUSCH of a subframe #2 is scheduled by an uplink grant transmitted in a subframe #6 of a previous radio frame.

TABLE 1

|  | 0 | 1 | 2 | 3 | 4 | 5 | 6 | 7 | 8 | 9 |
|---|---|---|---|---|---|---|---|---|---|---|
| UL/DL Config #0 | D | S | U 6, (5) | U (6) | U 0 | D | S | U 1, (0) | U (1) | U 5 |
| UL/DL Config #1 | D | S | U 6 | U 9 | D | D | S | U 1 | U 4 | D |
| UL/DL Config #2 | D | S | U 8 | D | D | D | S | U 3 | D | D |
| UL/DL Config #3 | D | S | U 8 | U 9 | U 0 | D | D | D | D | D |
| UL/DL Config #4 | D | S | U 8 | U 9 | D | D | D | D | D | D |
| UL/DL Config #5 | D | S | U 8 | D | D | D | D | D | D | D |
| UL/DL Config #6 | D | S | U 5 | U 6 | U 9 | D | S | U 0 | U 1 | D |

Figure 11:
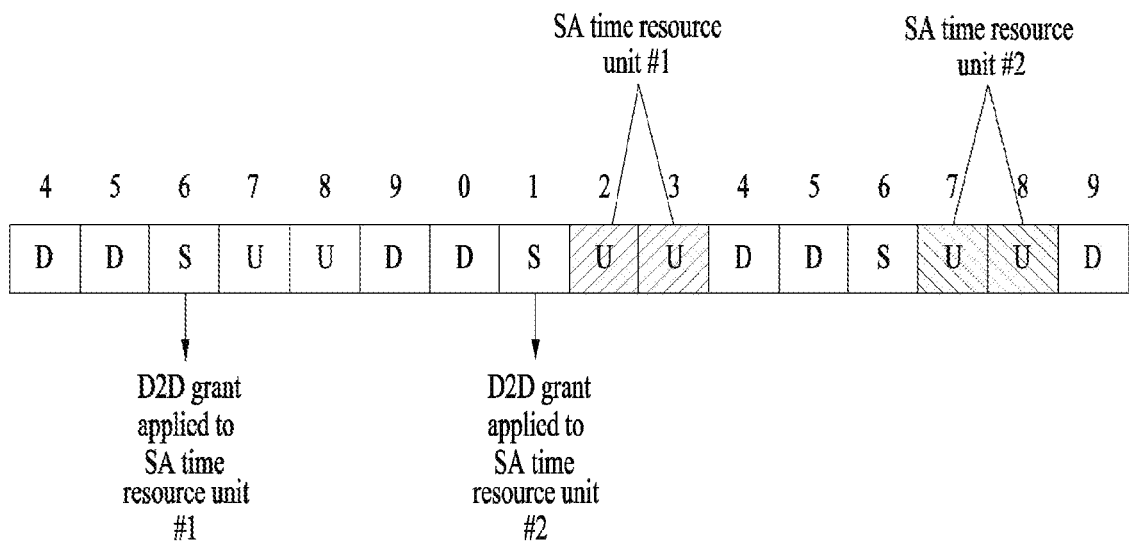
FIG. 11 is a diagram for an example of allocating SA time resource unit using a D2D grant in a TDD system according to embodiment of the present invention.

FIG. 11 is a diagram for an example of allocating SA time resource unit using a D2D grant in a TDD system according to embodiment of the present invention.

FIG. 11 assumes a case of UL/DL configuration #1. Referring to FIG. 11, it is able to see that a D2D grant, which is positioned at an uplink grant timing traced from a first subframe of an SA time resource unit, schedules the SA time resource. In this case, referring to FIG. 11, SA time resource units #1 and #2 are configured by subframes #2, #3 and subframes #7 and #8, respectively. Hence, a D2D grant for scheduling SA in each SA time resource unit is transmitted in subframes #6 and #1 corresponding to subframes in which uplink transmission in subframes #2 and #7 is scheduled according to a timeline of the UL/DL configuration #1.

The principle mentioned earlier in FIG. 10 can be applied to the example of FIG. 11. Hence, after a subframe in which a previous SA time resource unit is lastly scheduled, it may be able to schedule the SA time resource unit.

Figure 12:
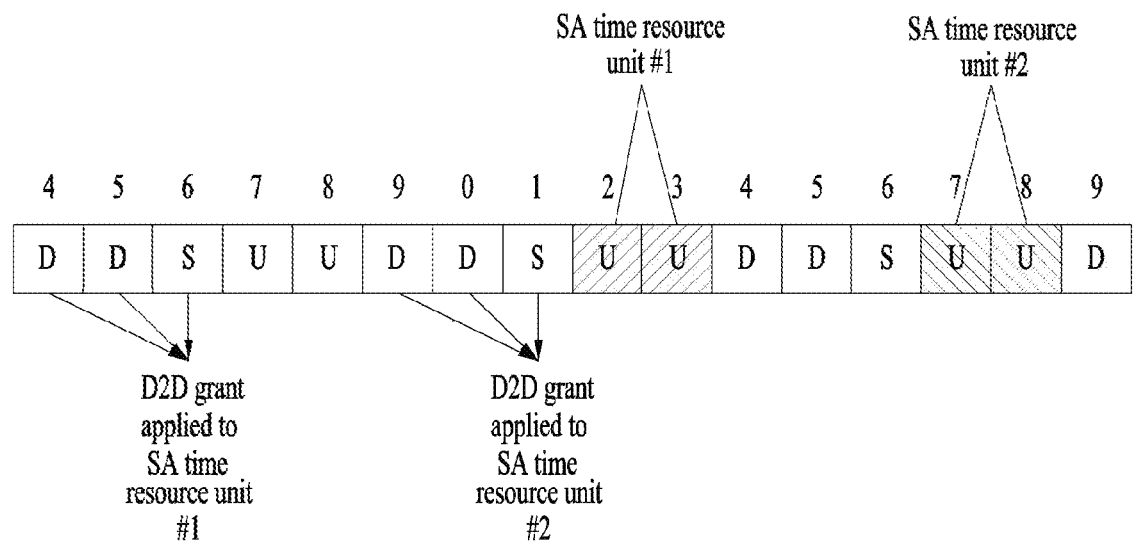
FIG. 12 is a diagram for a different example of allocating SA time resource unit using a D2D grant in a TDD system according to embodiment of the present invention.

FIG. 12 is a diagram for a different example of allocating SA time resource unit using a D2D grant in a TDD system according to embodiment of the present invention. When FIG. 12 is compared with FIG. 11, it is able to check that a D2D grant for an SA time resource unit #1 can be transmitted in subframes #4 and #5 as well. Moreover, it is able to see that a D2D grant for an SA time resource unit #2 can be transmitted in subframes #9 and #0 as well.

Figure 13:
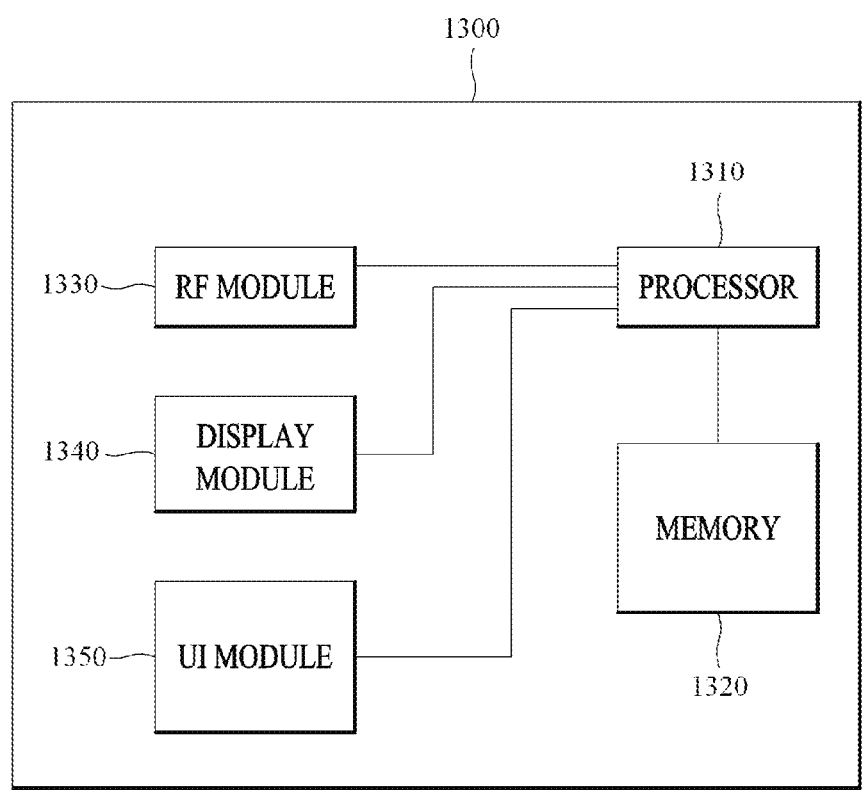
FIG. 13 is a block diagram for a communication device according to one embodiment of the present invention.

FIG. 13 is a block diagram for a communication device according to one embodiment of the present invention.

Referring to FIG. 13, a communication apparatus 1300 includes a processor 1310, a memory 1320, an RF module 1330, a display module 1340, and a User Interface (UI) module 1350.

The communication device 1300 is shown as having the configuration illustrated in FIG. 13, for the convenience of description. Some modules may be added to or omitted from the communication apparatus 1300. In addition, a module of the communication apparatus 1300 may be divided into more modules. The processor 1310 is configured to perform operations according to the embodiments of the present invention described before with reference to the drawings. Specifically, for detailed operations of the processor 1310, the descriptions of FIGS. 1 to 12 may be referred to.

The memory 1320 is connected to the processor 1310 and stores an Operating System (OS), applications, program codes, data, etc. The RF module 1330, which is connected to the processor 1310, upconverts a baseband signal to an RF signal or downconverts an RF signal to a baseband signal. For this purpose, the RF module 1330 performs digital-to-analog conversion, amplification, filtering, and frequency upconversion or performs these processes reversely. The display module 1340 is connected to the processor 1310 and displays various types of information. The display module 1340 may be configured as, not limited to, a known component such as a Liquid Crystal Display (LCD), a Light Emitting Diode (LED) display, and an Organic Light Emitting Diode (OLED) display. The UI module 1350 is connected to the processor 1310 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of allocating a resource for a control signal of D2D direct communication in a wireless communication system and an apparatus therefor are described with reference to examples applied to 3GPP LTE system, it may be applicable to various kinds of wireless communication systems as well as the 3GPP LTE system.

What is claimed is:

1. A method of transmitting a control channel of device-to-device (D2D) direct communication in a wireless communication system, the method performed by a first user equipment (UE) and comprising:
   receiving, from a base station at a first subframe, a first grant signal for allocating i) first resources for a first control channel and ii) second resources for a first data channel related to the first control channel, wherein the first resources include a first time resource comprising two or more consecutive subframes;
   transmitting, to a second UE, the first control channel using the first time resource based on the first grant signal; and
   transmitting, to the second UE, the first data channel using at least one of the second resources,
   wherein the first subframe can be positioned from a subframe after which a previous control channel can be scheduled, and up to a predetermined number of subframes before a starting subframe of the first time resource, and
   wherein the first control channel is transmitted to the second UE in each of the two or more consecutive subframes.

2. The method of claim 1, wherein the first subframe corresponds to a downlink subframe, and wherein the first time resource corresponds to an uplink subframe.

3. The method of claim 1, wherein the predetermined number of subframes corresponds to 4 subframes.

4. A first user equipment (UE) performing device-to-device (D2D) direct communication in a wireless communication system, the first UE comprising:
   a wireless communication transceiver configured to transceive a signal with a base station or a second UE; and
   a processor configured to process the signal, the processor configured to:
   receive, from the base station at a first subframe, a first grant signal for allocating i) first resources for a first control channel and ii) second resources for a first data channel related to the first control channel, wherein the first resources include a first time resource comprising two or more consecutive subframes;
   control the wireless communication transceiver to transmit, to the second UE, the first control channel using the first time resource based on the first grant signal; and
   control the wireless communication transceiver to transmit, to the second UE, the first data channel using at least one of the second resources,
   wherein the first subframe can be positioned from a subframe after which a previous control channel can be scheduled, and up to a predetermined number of subframes before a starting subframe of the first time resource, and
   wherein the first control channel is transmitted to the second UE in each of the two or more consecutive subframes.

5. The first UE of claim 4, wherein the first subframe corresponds to a downlink subframe, and wherein the first time resource corresponds to an uplink subframe.

6. The first UE of claim 4, wherein the predetermined number of subframes corresponds to 4 subframes.

* * * * *